_US010572457B2_

United States Patent
Tatani

(10) Patent No.: US 10,572,457 B2
(45) Date of Patent: Feb. 25, 2020

(54) DATABASE CONSTRUCTION DEVICE, DATABASE CONSTRUCTION METHOD, AND DATABASE CONSTRUCTION PROGRAM

(71) Applicant: Iwasaki Electric Mfg. Co., Ltd., Sasayama-shi, Hyogo (JP)

(72) Inventor: Kenji Tatani, Sasayama (JP)

(73) Assignee: IWASAKI ELECTRIC MFG. CO., LTD., Sasayama-Shi (JP)

( * ) Notice: Subject to any disclaimer, the term of this patent is extended or adjusted under 35 U.S.C. 154(b) by 160 days.

(21) Appl. No.: 15/567,674

(22) PCT Filed: Feb. 13, 2017

(86) PCT No.: PCT/JP2017/005084
§ 371 (c)(1),
(2) Date: Oct. 19, 2017

(87) PCT Pub. No.: WO2017/183265
PCT Pub. Date: Oct. 26, 2017

(65) Prior Publication Data
US 2018/0218012 A1 Aug. 2, 2018

(30) Foreign Application Priority Data
Apr. 20, 2016 (JP) ................................. 2016-084750

(51) Int. Cl.
*G06F 16/21* (2019.01)
*G06F 16/22* (2019.01)

(52) U.S. Cl.
CPC ............ *G06F 16/212* (2019.01); *G06F 16/22* (2019.01)

(58) Field of Classification Search
USPC ........................................................ 707/804
See application file for complete search history.

(56) References Cited

U.S. PATENT DOCUMENTS 7,619,655 B2 * 11/2009 Kondo ................. H04N 21/222
  348/208.13
8,019,752 B2 * 9/2011 Ferrari .................. G06F 16/904
  707/722

(Continued)

FOREIGN PATENT DOCUMENTS

JP 2002-366401 12/2002
JP 2005-251061 9/2005

(Continued)

OTHER PUBLICATIONS

International Search Report dated May 16, 2017, 8 pages.

*Primary Examiner* — Kim T Nguyen
(74) *Attorney, Agent, or Firm* — Rankin, Hill & Clark LLP

(57) ABSTRACT

Appearance of a forming condition of data constituting a database is promoted when work to construct the database is made efficient. The database construction device includes an original file storage, a configuration data specification information storage, and a database construction unit. The database construction unit stores one of pieces of original data as follows in the database storage device as at least a part of the database while correlating the one of pieces of original data with configuration data specification information. The original data is correlated with original data specification information stored in the configuration data specification information storage in the pieces of original data specification information of an original file. The original data specification information indicates a plurality of kinds of original data forming conditions. The configuration data specification information indicates a plurality of kinds of database configuration data forming conditions.

1 Claim, 7 Drawing Sheets

(56) References Cited

U.S. PATENT DOCUMENTS

| | | | | |
|---|---|---|---|---|
| 8,091,426 B2* | 1/2012 | Komatsu | ............... | G01N 29/04 |
| | | | | 73/602 |
| 8,402,048 B2* | 3/2013 | Egi | ............... | G06F 21/10 |
| | | | | 707/706 |
| 8,490,000 B2* | 7/2013 | Okuwaki | ............... | G06F 17/50 |
| | | | | 345/420 |
| 8,514,444 B2* | 8/2013 | Tokashiki | ............... | G06K 15/00 |
| | | | | 271/3.15 |
| 8,515,569 B2* | 8/2013 | Hanawa | ............... | G06Q 10/06 |
| | | | | 700/108 |
| 8,655,869 B2* | 2/2014 | Ferrari | ............... | G06F 16/904 |
| | | | | 707/722 |
| 8,745,232 B2* | 6/2014 | Parthasarathy | ............... | H04L 51/14 |
| | | | | 709/226 |

FOREIGN PATENT DOCUMENTS

| | | |
|---|---|---|
| JP | 2006-323505 | 11/2006 |
| JP | 2007-026389 | 2/2007 |
| JP | 2007-213551 | 8/2007 |
| JP | 2010-128892 | 6/2010 |

* cited by examiner

FIG. 4

| 128 | 124 | 126 | 122 | | | 120 |
|---|---|---|---|---|---|---|
| | 1 | Voltage value | Frequency | Current value | Resistance value | |
| | 2 | 100 | 20 | 4 | 7 | |
| | 3 | 100 | 30 | 5 | 8 | |
| | 4 | 200 | 30 | 6 | 9 | |

FIG. 5

| | Voltage value | Frequency | Current value | Resistance value | |
|---|---|---|---|---|---|
| | 1 0 0 | 2 0 | 4 | 7 | ☐ |
| | 1 0 0 | 3 0 | 5 | 8 | ☐ |
| | 2 0 0 | 3 0 | 6 | 9 | ☐ |
| | ☐ | ☐ | ☐ | ☐ | OK |

Check data to be registered in database and measurement condition

FIG. 6

| 1 | 2 | 3 | 4 | 5 | 6 | 7 | 8 |
|---|---|---|---|---|---|---|---|
| 1, 1 | BF/A | 1, 1 | 1, 1 | 1, 2 | 2, 1 | 2, 2 | — |
| 2, 1 | BF/A | 2, 1 | 1, 1 | 1, 2 | 2, 1 | 2, 2 | — |
| 3, 1 | BF/A | 3, 1 | 1, 1 | 1, 2 | 2, 1 | 2, 2 | — |
| 4, 1 | BF/A | 4, 1 | 1, 1 | 1, 2 | 2, 1 | 2, 2 | — |
| 1, 2 | BF/A | 1, 1 | 1, 1 | 1, 3 | 2, 1 | 2, 3 | — |
| 2, 2 | BF/A | 2, 1 | 1, 1 | 1, 3 | 2, 1 | 2, 3 | — |
| 3, 2 | BF/A | 3, 1 | 1, 1 | 1, 3 | 2, 1 | 2, 3 | — |
| 4, 2 | BF/A | 4, 1 | 1, 1 | 1, 3 | 2, 1 | 2, 3 | — |
| 1, 3 | BF/A | 1, 1 | 1, 1 | 1, 4 | 2, 1 | 2, 4 | — |
| 2, 3 | BF/A | 2, 1 | 1, 1 | 1, 4 | 2, 1 | 2, 4 | — |
| 3, 3 | BF/A | 3, 1 | 1, 1 | 1, 4 | 2, 1 | 2, 4 | — |
| 4, 3 | BF/A | 4, 1 | 1, 1 | 1, 4 | 2, 1 | 2, 4 | — |

FIG. 7

| 1 | 2 | | | 3 | 4 | 5 | 6 | 7 | 8 |
|---|---|---|---|---|---|---|---|---|---|
| 1 | 1, 1 | B | F | A | Voltage value | 100 | Frequency | 20 | 0 |
| 2 | 2, 1 | B | F | A | Frequency | 100 | Frequency | 20 | 0 |
| 3 | 3, 1 | B | F | A | Current value | 100 | Frequency | 20 | 0 |
| 4 | 4, 1 | B | F | A | Resistance value | Voltage value | 100 | Frequency | 20 | 0 |
| 5 | 1, 2 | B | F | A | Voltage value | 100 | Frequency | 30 | 0 |
| 6 | 2, 2 | B | F | A | Frequency | 100 | Frequency | 30 | 0 |
| 7 | 3, 2 | B | F | A | Current value | 100 | Frequency | 30 | 1 |
| 8 | 4, 2 | B | F | A | Resistance value | Voltage value | 100 | Frequency | 30 | 0 |
| 9 | 1, 3 | B | F | A | Voltage value | 200 | Frequency | 30 | 0 |
| 10 | 2, 3 | B | F | A | Frequency | 200 | Frequency | 30 | 0 |
| 11 | 3, 3 | B | F | A | Current value | Voltage value | 200 | Frequency | 30 | 0 |
| 12 | 4, 3 | B | F | A | Resistance value | Voltage value | 200 | Frequency | 30 | 0 |

DATABASE CONSTRUCTION DEVICE, DATABASE CONSTRUCTION METHOD, AND DATABASE CONSTRUCTION PROGRAM

TECHNICAL FIELD

The present invention relates to a database construction device, a database construction method, and a database construction program.

BACKGROUND ART

Patent Document 1 discloses a data input device. The data input device includes a database storage device, a data sheet input and output device, a setting file storage device, a table update command production device, and a database management device. The database storage device stores a database constructed with a plurality of tables. The data sheet input and output device displays an input table. The input table is set in advance according to a plurality of update job menus for a database. The input table has item names and item value input boxes with respect to all items to be input. An item value can be input to each item value input box of the input table by the data sheet input and output device. The setting file storage device stores a comparative table between the update job menu and the item name of the input table necessary for the update job menu and a comparative table between the item name of the input table and the item name of the table. The table update command production device refers to the comparative table of the setting file storage device to produce a table update command in each table. The table update command is used to substitute the item value input to the data sheet input and output device for the item value of each table corresponding to the input table. The database management device executes the table update command, and collectively updates the item values of the tables. According to the data input device disclosed in Patent Document 1, all necessary pieces of data across a plurality of screens or a plurality of tables of the database can collectively be input, deleted, and updated by one operation.

Patent Document 2 discloses a data processing system. In the data processing system, a terminal device of a registered user and a server having a database are connected to each other through a network. The terminal device includes an initial setting text, a read unit, a data processing unit, and a holding unit. The initial setting text is provided by processing information performing data processing when the data is transferred from a database to another database. The read unit reads database information of a data processing target from the server as an information text. The data processing unit processes the data of the information text to produce an output information text based on the initial setting text. The holding unit holds the output information text which can be transferred to another database. According to the data processing system disclosed in Patent Document 2, data transfer is performed more easily.

Patent Document 3 discloses a data management system. The data management system includes a column management file, a row management file, and a value management file. At least a column ID is defined in advance, and statically stored in the column management file. The column ID uniquely indicates each data item constituting a management target record. In reading the record, the row management file dynamically stores a row ID corresponding to the read record. The row ID uniquely indicates the read record. The value management file uniquely identifies the item value of the data item of the read record using the row ID and the column ID, and dynamically stores the item value in reading the record. According to the data management system disclosed in Patent Document 3, data having various formats can be exchanged for each other.

PRIOR ART DOCUMENTS

Patent Documents

Patent Document 1: Japanese Patent Laid-open Publication No. 2007-26389
Patent Document 2: Japanese Patent Laid-open Publication No. 2005-251061
Patent Document 3: Japanese Patent Laid-open Publication No. 2007-213551

SUMMARY OF THE INVENTION

Problems to be Solved by the Invention

However, in the data input device disclosed in Patent Document 1, the data processing system disclosed in Patent Document 2, and the data management system disclosed in Patent Document 3, there is a problem in that measures against various factors influencing the data are insufficient.

The problem will specifically be described. For example, in the case that some knowledge is obtained by analyzing data, if an unexpected factor of an analyst influences the data underlying the analysis, the influence also affects validity of an analysis result. Because the influence affects the validity, the influence of the unexpected factor of the analyst should be eliminated. The data can be obtained after being influenced by some factor without being not limited to the example. When the data is analyzed without any consideration of the influence of the factor, reliability of the knowledge derived from the data is degraded.

The present invention solves such a problem. An object of the present invention is to provide a database construction device, a database construction method, and a database construction program, which promote appearance of an measurement condition of added data when work to construct a database is made efficient.

Solutions to the Problems

A database construction device, a database construction method, and a database construction program according to the present invention will be described with reference to the drawings. The reference numerals in the drawings are used in this column to assist understanding of the content of the invention, and it is not intended to limit the content to the illustrated scope.

In order to solve the above problem, according to one aspect of the present invention, a database construction device 62 includes an original file storage 82, a designation information input unit 80, and a storage device controller 84. The original file storage 82 stores an original file. The original file includes a plurality of pieces of original data 120 indicating the measured values and original data specification information 122. The original data specification information 122 indicates a combination of a plurality of kinds of measurement conditions for the value, which is correlated with each of the plurality of pieces of original data 120 on a one-to-one basis and indicated by the original data 120. The designation information input unit 80 inputs the following designation information 130. The designation information 130 indicates designation of any one of the combinations of the plurality of kinds of measurement conditions indicated by the original data specification information 122 and designation of any one of the original data 120. The storage device controller 84 controls the database storage device 60. The database storage device 60 stores the database. The database includes a plurality of pieces of database configuration data indicating the measured values and configuration data specification information 160, 162. The configuration data specification information 160, 162 are correlated with each of the plurality of pieces of database configuration data. Therefore, the database storage device 60 is controlled such that at least a part of the database is constructed based on the original file. The storage device controller 84 includes a configuration data specification information storage 92 and a database construction unit 90. The configuration data specification information storage 92 stores the configuration data specification information 160, 162 while correlating the configuration data specification information 160, 162 with the original data specification information 122. The database construction unit 90 controls the database storage device 60 to construct the database. Therefore, the following original data 120 is stored in the database storage device 60 as at least a part of the database while being correlated with the configuration data specification information 160, 162. The original data 120 is designated by designation information. The database construction unit 90 correlates the configuration data specification information 160, 162, which are stored in the configuration data specification information storage 92 while being correlated with the original data specification information 122, with the original data 120. In the original data 120, a value is correlated with the original data specification information 122 in a one-to-one basis. In the original data specification information 122, a value is correlated with the original data 120 in a one-to-one basis. The value correlating the original data 120 with the original data specification information 122 is equal to the value correlating the original data specification information 122 with the original data 120, whereby the original data 120 and the original data specification information 122 are indirectly correlated with each other. The configuration data specification information 160, 162 indicate a combination of the plurality of kinds of measurement conditions for the value indicated by the database configuration data. The configuration data specification information storage 92 stores information indicating the combination of the plurality of kinds of measurement conditions indicated by the designation information as the configuration data specification information 160, 162. The database construction unit 90 correlates a value, which corresponds to the original data 120 designated by the designation information and is correlated with the original data specification information 122, with the configuration data specification information stored in the configuration data specification information storage 92 as a value correlated with the original data 120, specifies the original data 120 designated by the designation information and the configuration data specification information 160, 162 stored in the configuration data specification information storage 92 based on the value correlated with the original data specification information 122 and the value correlated with the original data 120, and stores the original data 120 and the configuration data specification information 160, 162, which are specified based on the value correlated with the original data specification information 122 and the value correlated with the original data 120, in the database storage device 60.

In the database construction device 62 of the present invention, the original file storage 82 stores the original file. The database construction unit 90 controls the database storage device 60. Therefore, the original data 120 is stored in the database storage device 60 as at least a part of the database while being correlated with the configuration data specification information 160, 162. Because the correlation of the information is performed under the control of the database construction unit 90, labor and time for constructing the database can be saved compared with the case where the correlation is performed according to the operation of an operator each time the original data 120 is stored. That is, the work to construct the database is made efficient. The original data 120 stored in the database storage device 60 is correlated with the plurality of kinds of measurement conditions for the measured value indicated by the original data 120 on a one-to-one basis in the original file. The database construction unit 90 correlates the configuration data specification information 160, 162, which are stored in the configuration data specification information storage 92 while being correlated with the original data specification information 122, with the original data 120. The original data specification information 122 indicates the plurality of kinds of measurement conditions for the measured value indicated by the original data 120. The configuration data specification information 160, 162 indicate the plurality of kinds of measurement conditions for the measured value indicated by the database configuration data. Therefore, based on the correlation between the original data specification information 122 and the configuration data specification information 160, 162, the plurality of kinds of measurement conditions for the measured value indicated by the database configuration data correspond to the plurality of kinds of measurement conditions for the measured value indicated by the original data 120. Therefore, the appearance of the plurality of kinds of measurement conditions influencing the database configuration data can be promoted. As a result, the appearance of the measurement conditions of the data constituting the database can be promoted when the work to construct the database is made efficient.

Alternatively, it is desirable that the plurality of kinds of measurement conditions indicated by the original data specification information 122 can fluctuate independently of each other.

In the case that the plurality of kinds of measurement conditions can fluctuate independently of each other, an influence of interaction between the measurement conditions can be suppressed compared with the case that the measurement conditions can fluctuate due to a mutual influence. Because the influence of the interaction is suppressed, the measurement conditions of the original data 120 are easily clarified compared with the case that the measurement conditions can fluctuate due to the mutual influence.

According to another aspect of the present invention, a database construction method includes an original file storage step S100, a designation information input step S102, a configuration data specification information storage step S104, and a storage control step S106. The original file storage step S100 is one in which a storage 32 of a computer 10 stores an original file. The computer 10 includes the storage 32, a controller 30, and information input units 36 and 40. The original file includes the plurality of pieces of original data 120 indicating the measured values and the original data specification information 122. The original data specification information 122 indicates a combination of a plurality of kinds of measurement conditions for a value, which is correlated with each of the plurality of pieces of original data 120 on a one-to-one basis and indicated by the original data 120. In the designation information input step S102, the designation information is input to the information input units 36, 40. The designation information indicates the designation of any one of the combinations of the plurality of kinds of measurement conditions indicated by the original data specification information 122 and the designation of any one of the original data 120. The configuration data specification information storage step S104 is one in which the storage 32 stores the configuration data specification information 160, 162 while correlating the configuration data specification information 160, 162 with the original data specification information 122. The storage control step S106 is one in which the controller 30 controls the storage 32. Through the control, the storage 32 stores the following original data 120 as at least a part of the database. The database includes a plurality of pieces of database configuration data indicating the measured values and the configuration data specification information 160, 162 correlated with each of the plurality of pieces of database configuration data. The original data 120 stored as at least a part of the database is designated by the designation information. When any one of the original data 120 is stored as at least a part of the database, the original data 120 is correlated with the configuration data specification information 160, 162, which are stored while being correlated with the original data specification information 122 in the configuration data specification information storage step S104. In the original data 120, a value is correlated with the original data specification information 122 in a one-to-one basis. In the original data specification information 122, a value is correlated with the original data 120 in a one-to-one basis. The value correlating the original data 120 with the original data specification information 122 is equal to the value correlating the original data specification information 122 with the original data 120, whereby the original data 120 and the original data specification information 122 are indirectly correlated with each other. The configuration data specification information 160, 162 indicate a combination of the plurality of kinds of measurement conditions for the value indicated by the database configuration data. The configuration data specification information storage step S104 includes a step in which the storage 32 stores information indicating the combination of the plurality of kinds of measurement conditions indicated by the designation information as the configuration data specification information 160, 162. The storage control step S106 includes: a step of correlating a value, which corresponds to the original data 120 designated by the designation information and is correlated with the original data specification information 122, with the configuration data specification information 160, 162 stored in the configuration data specification information storage step S104 as a value correlated with the original data 120; and a step of specifying the original data 120 designated by the designation information and the configuration data specification information 160, 162 stored in the configuration data specification information storage step S104 based on the value correlated with the original data specification information 122 and the value correlated with the original data 120, and storing the original data 120 and the configuration data specification information 160, 162, which are specified based on the value correlated with the original data specification information 122 and the value correlated with the original data 120, in the storage 32.

In the database construction method of the present invention, the original file storage 82 stores the original file in the original file storage step S100. In the storage control step S106, the storage 32 stores the original data 120 designated by the designation information as at least a part of the database. Because the correlation of the information is performed under the control of the controller 30, the labor and time for constructing the database can be suppressed compared to the case that the correlation is performed by the operation of an operator every time the original data 120 is stored. That is, the work to construct the database is made efficient. The original data 120 stored in the storage 32 in the storage control step S106 is correlated with the plurality of kinds of measurement conditions for the measured value indicated by the original data 120 on a one-to-one basis in the original file. The configuration data specification information 160, 162, which are stored while being correlated with the original data specification information 122 in the configuration data specification information storage step S104, are correlated with the original data 120. The original data specification information 122 indicates the plurality of kinds of measurement conditions for the measured value indicated by the original data 120. The configuration data specification information 160, 162 indicate the plurality of kinds of measurement conditions for the measured value indicated by the database configuration data. Therefore, based on the correlation between the original data specification information 122 and the configuration data specification information 160, 162, the plurality of kinds of measurement conditions for the measured value indicated by the database configuration data correspond to the plurality of kinds of measurement conditions for the measured value indicated by the original data 120. Therefore, the appearance of the plurality of kinds of measurement conditions influencing the database configuration data can be promoted. As a result, the appearance of the measurement conditions of the data constituting the database can be promoted when the work to construct the database is made efficient.

According to another aspect of the present invention, a database construction program causes the computer 10 to execute the original file storage step S100, the designation information input step S102, the configuration data specification information storage step S104, and the storage control step S106. The original file storage step S100 is one in which a storage 32 of a computer 10 stores an original file. The computer 10 includes the storage 32, a controller 30, and information input units 36 and 40. The original file includes the plurality of pieces of original data 120 indicating the measured values and the original data specification information 122. The original data specification information 122 indicates a combination of a plurality of kinds of measurement conditions for a value, which is correlated with each of the plurality of pieces of original data 120 on a one-to-one basis and indicated by the original data 120. In the designation information input step S102, the designation information is input to the information input units 36, 40. The designation information indicates the designation of any one of the combinations of the plurality of kinds of measurement conditions indicated by the original data specification information 122 and the designation of any one of the original data 120. The configuration data specification information storage step S104 is one in which the storage 32 stores the configuration data specification information 160, 162 while correlating the configuration data specification information 160, 162 with the original data specification information 122. The storage control step S106 is one in which the controller 30 controls the storage 32. Through the control, the storage 32 stores the following original data 120 as at least a part of the database. The database includes a plurality of pieces of database configuration data indicating the measured values and the configuration data specification information 160, 162 correlated with each of the plurality of pieces of database configuration data. The original data 120 stored as at least a part of the database is designated by the designation information. When any one of the original data 120 is stored as at least a part of the database, the original data 120 is correlated with the configuration data specification information 160, 162, which are stored while being correlated with the original data specification information 122 in the configuration data specification information storage step S104. In the original data 120, a value is correlated with the original data specification information 122 in a one-to-one basis. In the original data specification information 122, a value is correlated with the original data 120 in a one-to-one basis. The value correlating the original data 120 with the original data specification information 122 is equal to the value correlating the original data specification information 122 with the original data 120, whereby the original data 120 and the original data specification information 122 are indirectly correlated with each other. The configuration data specification information 160, 162 indicate a combination of the plurality of kinds of measurement conditions for the value indicated by the database configuration data. The configuration data specification information storage step S104 includes a step in which the storage 32 stores information indicating the combination of the plurality of kinds of measurement conditions indicated by the designation information as the configuration data specification information 160, 162. The storage control step S106 includes: a step of correlating a value, which corresponds to the original data 120 designated by the designation information and is correlated with the original data specification information 122, with the configuration data specification information 160, 162 stored in the configuration data specification information storage step S104 as a value correlated with the original data 120; and a step of specifying the original data 120 designated by the designation information and the configuration data specification information 160, 162 stored in the configuration data specification information storage step S104 based on the value correlated with the original data specification information 122 and the value correlated with the original data 120, and storing the original data 120 and the configuration data specification information 160, 162, which are specified based on the value correlated with the original data specification information 122 and the value correlated with the original data 120, in the storage 32.

In the database construction program of the present invention, the labor and time for constructing the database can be saved compared with the case that the correlation is performed by the operation of an operator every time the original data 120 is stored. That is, the work to construct the database is made efficient. Based on the correlation between the original data specification information 122 and the configuration data specification information 160, 162, the plurality of kinds of measurement conditions for the measured value indicated by the database configuration data correspond to the plurality of kinds of measurement conditions for the measured value indicated by the original data 120. Therefore, the appearance of the plurality of kinds of measurement conditions influencing the database configuration data can be promoted. As a result, the appearance of the measurement conditions of the data constituting the database can be promoted when the work to construct the database is made efficient.

Effects of the Invention

According to the database construction device, the database construction method, and the database construction program of the present invention, the appearance of the measurement conditions of the data constituting the database can be promoted when the work to construct the database is made efficient.

BRIEF DESCRIPTION OF THE DRAWINGS

FIG. 4 is a conceptual diagram illustrating a structure of an original file according to the embodiment of the present invention.

FIG. 5 is a conceptual diagram illustrating an example of an image displayed on a request display according to the embodiment of the present invention.

FIG. 6 is a conceptual diagram illustrating a content of a template file according to the embodiment of the present invention.

FIG. 7 is a conceptual diagram illustrating the content of a configuration data specification information file according to the embodiment of the present invention.

DETAILED DESCRIPTION OF THE INVENTION

Figure 1:
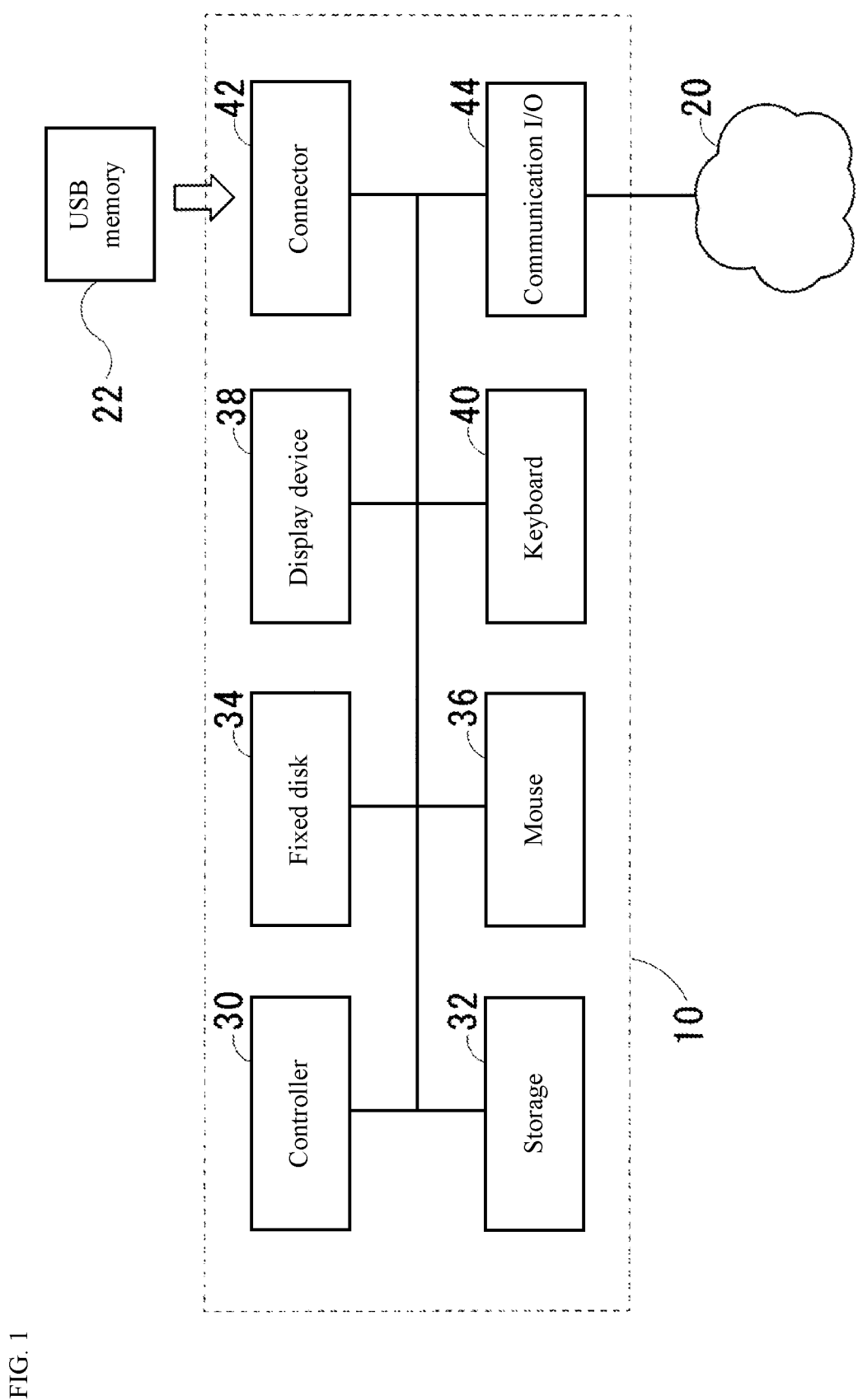
FIG. 1 is a conceptual diagram illustrating a hardware configuration of a known computer.

Hereinafter, an embodiment of the present invention will be described with reference to the drawings. In the following description, the same parts are denoted by the same reference numerals. Their names and functions are also the same. Therefore, detailed description thereof will not be repeated.

[Description of Hardware Configuration of Computer]

Hereinafter, the embodiment of the present invention will be described. FIG. 1 is a conceptual diagram illustrating a hardware configuration of a known computer 10. The hardware configuration of the computer 10 will be described with reference to FIG. 1. The computer 10 of the embodiment includes a controller 30, a storage 32, a fixed disk 34, a mouse 36, a display device 38, a keyboard 40, a connector 42, and a communication I/O (Input and Output) 44. The controller 30 is constructed with a CPU (Central Processing Unit) and the like. The controller 30 executes a program read from the storage 32, and controls each device constituting the computer 10 according to the procedure defined in the program. The storage 32 is constructed with a ROM (Read Only Memory), a RAM (Random Access Memory), and the like. The storage 32 stores a program and data. The fixed disk 34 records a program. The mouse 36 and the keyboard 40 generate a signal in response to operator input. Therefore, information is input to the computer 10. The display device 38 displays information as an image. A USB (Universal Serial Bus) memory 22 is connected to the connector 42. The program and information recorded in the USB memory 22 are read into the controller 30 through the connector 42. The communication I/O 44 communicates with a computer (not illustrated) through the Internet 20.

[Description of Functions of Virtual Database Construction Device and Virtual Database Storage Device]

Figure 2:
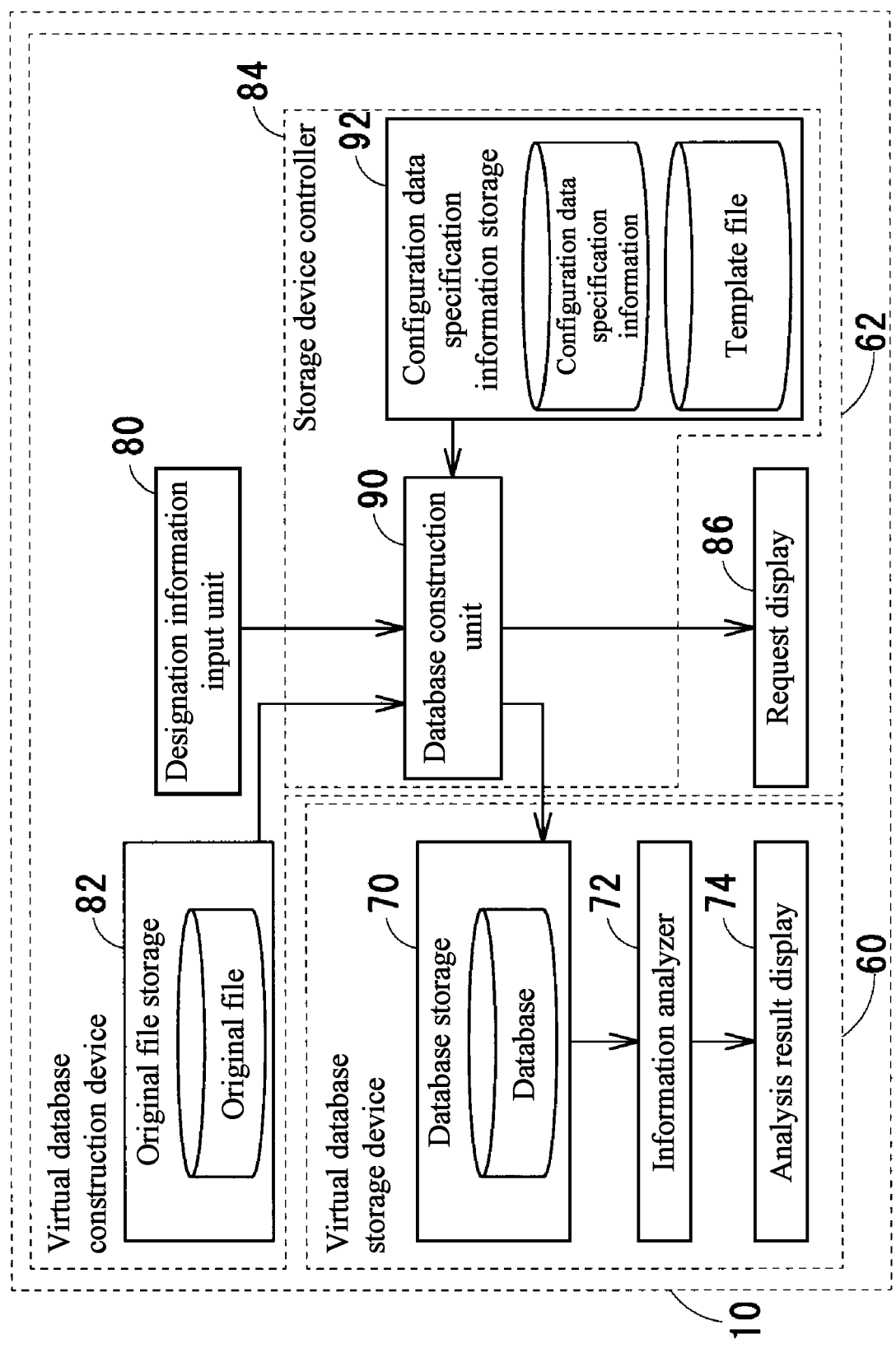
FIG. 2 is a functional block diagram of a virtual database construction device and a virtual database storage device according to an embodiment of the present invention.

FIG. 2 is a functional block diagram illustrating a virtual database storage device 60 and a virtual database construction device 62. Configurations and functions of the virtual database storage device 60 and virtual database construction device 62 of the embodiment will be described with reference to FIG. 2. The controller 30, the storage 32, the fixed disk 34, the mouse 36, the display device 38, the keyboard 40, the connector 42, and the communication I/O 44 of the computer 10 constitute the virtual database storage device 60 and the virtual database construction device 62. The virtual database storage device 60 stores a database. In the embodiment, the virtual database storage device 60 produces information for quality control based on the content of the database. The virtual database construction device 62 controls the virtual database storage device 60 such that the database is updated.

The virtual database storage device 60 includes a database storage 70, an information analyzer 72, and an analysis result display 74. The database storage 70 stores the database. The information analyzer 72 produces predetermined information according to the content of the database and a predetermined procedure. The analysis result display 74 displays the information produced by the information analyzer 72. In the embodiment, the information, which is produced by the information analyzer 72 and displayed by the analysis result display 74, is used in quality control. The specific content of this information and the procedure for producing this information are not directly related to the present invention. Therefore, the detailed description will not be repeated.

The virtual database construction device 62 includes a designation information input unit 80, an original file storage 82, a storage device controller 84, and a request display 86. Designation information is input to the designation information input unit 80 by an operator. A specific content of the designation information of the embodiment will be described later. The original file storage 82 stores an original file. A specific content of the original file of the embodiment will be described later. The storage device controller 84 controls the virtual database storage device 60. The request display 86 displays information making a request to input the designation information.

The storage device controller 84 includes the database construction unit 90 and the configuration data specification information storage 92. The database construction unit 90 controls the virtual database storage device 60 to cause the virtual database storage device 60 to construct a database. The configuration data specification information storage 92 stores a configuration data specification information file and a template file. The structures of the configuration data specification information file and template file in the configuration data specification information storage 92 will be described later.

[Description of Program]

As described above, the controller 30, the storage 32, the fixed disk 34, the mouse 36, the display 38, the keyboard 40, the connector 42, and the communication I/O 44 of the computer 10 constitute the virtual database storage device 60 and the virtual database construction device 62. The controller 30 executes the program read from the storage 32, thereby implementing these configurations. Generally, such a program is distributed while being recorded in a computer-readable recording medium such as the USB memory 22. Such a program may be distributed through the Internet 20. The program is once recorded in the fixed disk 34. The program executed by the controller 30 is one in which the program recorded in the fixed disk 34 is stored in the storage 32. Therefore, the most essential part of the present invention is software recorded in a computer-readable recording medium such as the USB memory 22.

[Description of Flowchart]

Figure 3:
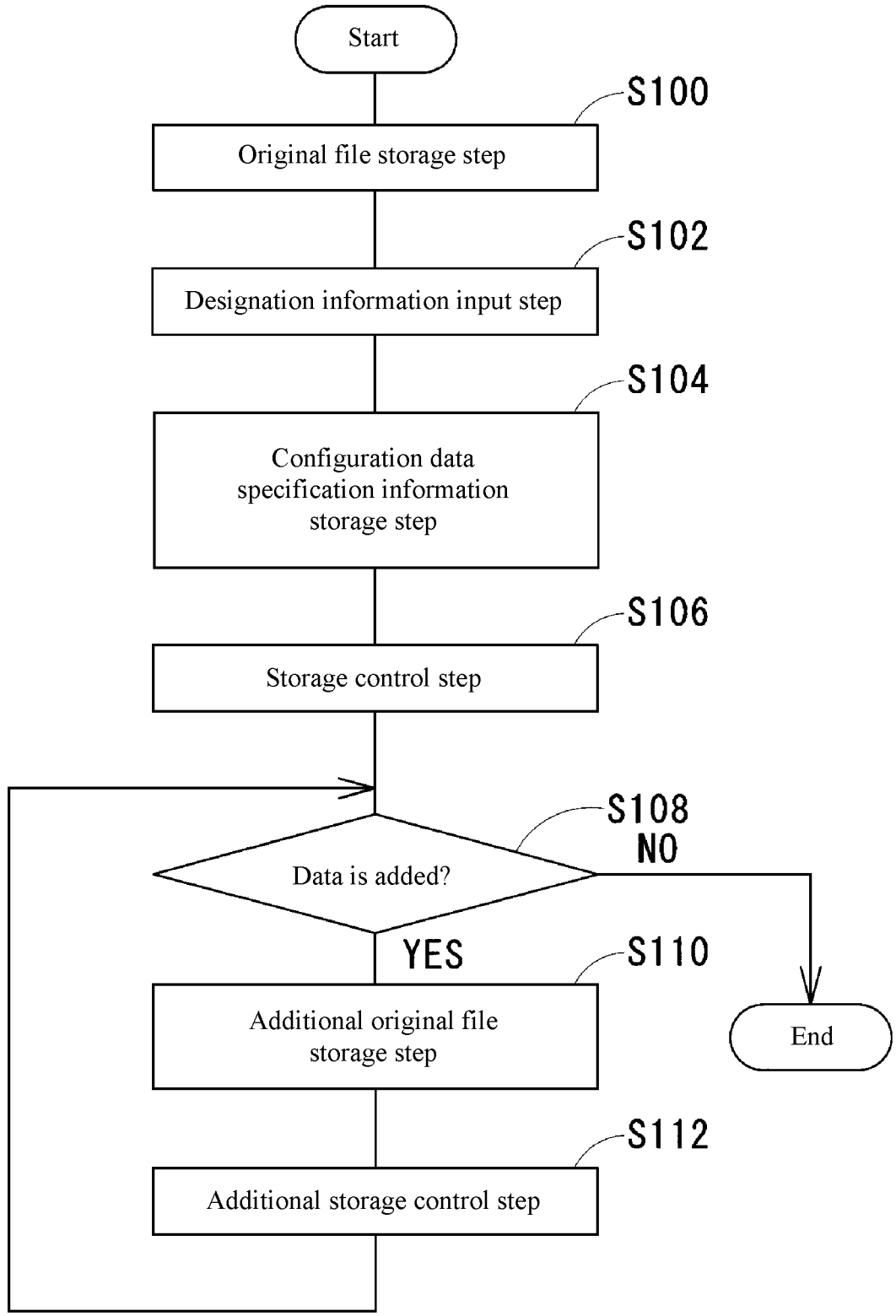
FIG. 3 is a flowchart illustrating a procedure for controlling a database construction method according to the embodiment of the present invention.

FIG. 3 is a flowchart illustrating a program executed by the controller 30 of the computer 10 of the embodiment. As illustrated in FIG. 3, the program causes the computer 10 to execute the following plurality of steps. The plurality of steps include an original file storage step S100, a designation information input step S102, a configuration data specification information storage step S104, a storage control step S106, an additional determination step S108, an additional original file storage step S110, and an additional storage control step S112. As a result of executing the program, the computer 10 performs the database construction method including the plurality of steps. A specific content of each step will be described below.

In the original file storage step S100, the original file storage 82 (actually, the storage 32) stores an original file. The original file includes a plurality of pieces of original data 120 and a plurality of pieces of original data specification information 122. The original data specification information 122 is correlated with any one of the original data 120 on a one-to-one basis.

In the designation information input step S102, the designation information input unit 80 (actually, the mouse 36 and the keyboard 40) receives a command to display the original data 120. When the command to display the original data 120 is input, the database construction unit 90 (actually, the controller 30) reads the original file from the original file storage 82. When the original file is read, the database construction unit 90 causes the request display 86 (actually, the display device 38) to display the content of the original file together with the information making a request to designate an original data forming condition. When the content of the original file is displayed, the designation information input unit 80 receives the input of designation information. The designation information indicates any one of the original data specification information 122. The designation information includes a combination of pieces of information indicating the original data forming condition.

In the configuration data specification information storage step S104, the configuration data specification information storage 92 (actually, the storage 32) stores the configuration data specification information. In the embodiment, the configuration data specification information storage 92 stores one of the configuration data specification information and one of the original data specification information 122 while correlating the one of the configuration data specification information with the one of the original data specification information 122.

In the storage control step S106, the database construction unit 90 controls the virtual database storage device 60. This enables the database storage 70 (actually, the storage 32) of the virtual database storage device 60 to store the following original data 120 while correlating the original data 120 with the configuration data specification information. The original data 120 is correlated with the original data specification information 122 stored in the configuration data specification information storage 92 in the plurality of pieces of original data specification information 122 of the original file. The original data 120 stored in the database storage 70 becomes database configuration data. This enables a database to be constructed. The database includes a plurality of pieces of database configuration data and a plurality of pieces of configuration data specification information. Each configuration data specification information is correlated with any one of the plurality of pieces of database configuration data. As a result, the virtual database storage device 60 is controlled by the database construction unit 90 based on the original file.

In the additional determination step S108, the database construction unit 90 determines whether new designation information is input to the designation information input unit 80. In the embodiment, the input of the new designation information is regarded as a request to add the database configuration data. When the request to add the database configuration data is made (YES in S108), the processing proceeds to the additional original file storage step S110. Otherwise (NO in S108), the processing is ended.

In the additional original file storage step S110, the original file storage 82 stores a new original file.

In the additional storage control step S112, the database construction unit 90 controls the virtual database storage device 60 such that new database configuration data is added to the database based on the new original file. A procedure for adding the new database configuration data is similar to the procedure for storing the database configuration data in the database storage 70 in the storage control step S106. Therefore, the configuration data specification information is also correlated with the newly-added database configuration data.

[Description of Operation]

The operation of the virtual database storage device 60 and the virtual database construction device 62 of the embodiment will be described by taking the case that the quality of an electronic component is managed by passing an alternating current through the electronic component as an example.

First, an inspection device (not illustrated) passes the alternating current through the electronic component (not illustrated). The inspection device measures the current passed through the electronic component and resistance of the electronic component. The inspection device sequentially stores values of the current and resistance, which are measured by the inspection device. Every time the inspection device performs measurement three times (in the embodiment, this number of times is a constant value determined based on a Y-coordinate value 158 of template data (to be described later)), the operator stores the value stored in the inspection device in the original file storage 82 (S100).

Figure 4:
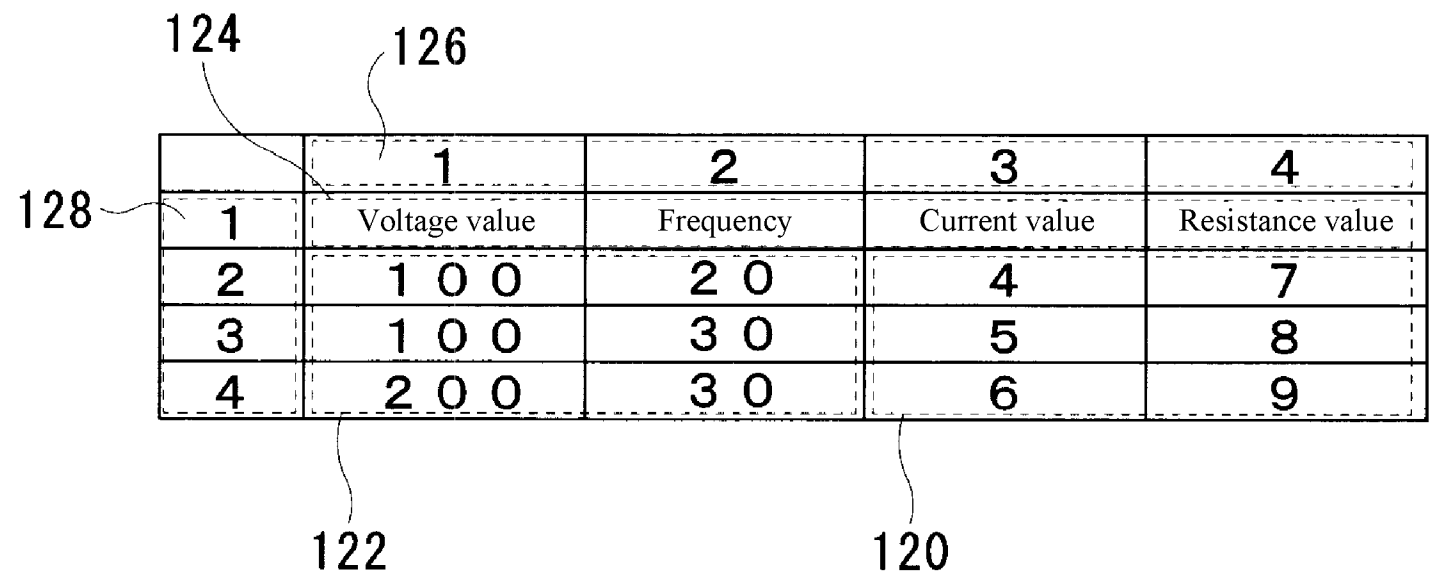

In the embodiment, the values are stored in the original file storage 82 together with information about the measured voltage and information about a frequency. The aggregate of information stored in this manner is the original file of the embodiment. FIG. 4 is a conceptual diagram illustrating a structure of the original file of the embodiment.

In the embodiment, the original file includes original data 120, original data specification information 122, comment information 124, an X-coordinate value 126, and a Y-coordinate value 128. The original data 120 is data that can become a part of a database stored in the virtual database storage device 60. In the original file of FIG. 4, the current value and the resistance value correspond to the original data 120. The original data specification information 122 is information for specifying the original data 120. As is clear from FIG. 4, in the embodiment, the original data specification information 122 indicates two kinds of measurement conditions. In the embodiment, the measurement conditions can fluctuate independently of each other. The comment information 124 indicates what kind of information the original data 120 and the original data specification information 122 are. In the original file of FIG. 4, text data such as "voltage value", "frequency", "current value", and "resistance value" corresponds to the comment information 124. The X-coordinate value 126 indicates a value correlated with the original data 120, the original data specification information 122, or the comment information 124. The Y-coordinate value 128 indicates a value, which is different from the X-coordinate value 126 and is correlated with the original data 120, the original data specification information 122, or the comment information 124. In the embodiment, the original data 120, the original data specification information 122, and the comment information 124 are correlated with the X-coordinate value 126 and the Y-coordinate value 128, so that the original data 120, the original data specification information 122, and the comment information 124 can be arranged on a two-dimensional plane. This enables the original data 120, the original data specification information 122, and the comment information 124 to be uniquely identified.

The X-coordinate value 126 is also a value used to correlate any one of the comment information 124 with the original data 120 and the original data specification information 122. The original data 120 and the original data specification information 122 are correlated with the comment information 124 common to the correlated X-coordinate value 126. Therefore, what kind of information the original data 120 and the respective original data specification information 122 are is indicated by the comment information 124 common to the correlated X-coordinate value 126. For the data in FIG. 4, three pieces of data "100", "100", and "200" correlated with the X-coordinate value 126 of "1" are correlated with the comment information 124 of "voltage value". Therefore, these three pieces of data are the voltage value. Three pieces of data "4", "5", and "6" correlated with the X-coordinate value 126 of "3" are correlated with the comment information 124 of "current value". Therefore, these three pieces of data are the current value.

The Y-coordinate value 128 is also a value used to correlate the original data 120 and the original data specification information 122 with each other. In the embodiment, the original data 120 and the original data specification information 122 are indirectly correlated with each other because the correlated Y-coordinate value 128 is common to the original data 120 and the original data specification information 122. Thus, what kind of measurement condition the original data 120 is obtained under is indicated by what kind of original data specification information 122 the original data 120 are correlated with. For the data in FIG. 4, the original data 120 of "4" correlated with the Y-coordinate value 128 of "2" is correlated with the measurement conditions of "100" and "20" correlated with the Y-coordinate value 128 of "2".

After storing the original file in the original file storage 82, the operator inputs the designation information to the designation information input unit 80 (S102). A procedure for inputting the designation information is as follows. The operator inputs a command to display the original data 120 to the designation information input unit 80. When the command to display the original data 120 is input, the database construction unit 90 reads the original file from the original file storage 82. When the original file is read, the database construction unit 90 causes the request display 86 to display the content of the original file together with the information making a request to designate the original data forming condition. FIG. 5 illustrates an example of an image displayed on the request display 86 at this time. Measurement condition checkboxes 130, registration data checkboxes 132, data type checkboxes 134, and an OK button 136 are indicated in the image. The operator checks one of the measurement condition checkboxes 130, one of the registered data checkboxes 132, and one of the data type checkboxes 134 by operating the mouse 36. However, in the embodiment, it is necessary for the operator to check at least two of the measurement condition checkboxes 130. Because only two measurement condition checkboxes 130 are displayed on the request display 86, it is necessary for the operator to check both the measurement condition checkboxes 130. In this case, it is assumed that the operator checks both the measurement condition checkboxes 130, the registered data checkbox 132 that is second from the top, and the data type checkbox 134 corresponding to the comment information 124 of "current value". When checking these checkboxes, the operator clicks the OK button 136 by operating the mouse 36. Therefore, the input of the designation information is completed. In the embodiment, a combination of the information indicating the measurement condition checkboxes 130 checked by the operator corresponds to a combination of the information indicating the original data forming condition. In the embodiment, in addition to a combination of the pieces of information indicating a plurality of kinds of original data forming conditions, the designation information includes information indicating data constituting a part of the database and information indicating the kind of data constituting a part of the database. As used herein, the "information indicating data constituting a part of the database" means information indicating the registered data checkbox 132 checked by the operator. The "information indicating the kind of data constituting a part of the database" means information indicating the data type checkbox 134 checked by the operator.

When the designation information is received, the database construction unit 90 reads a template file from the configuration data specification information storage 92. FIG. 6 is a conceptual diagram illustrating a structure of the template file of the embodiment.

The template file includes a measurement data reference destination coordinate 140, a reference destination file name 142, a data comment information reference destination coordinate 144, a first condition comment reference destination coordinate 146, a first condition data reference destination coordinate 148, a second condition comment reference destination coordinate 150, a second condition data reference destination coordinate 152, storage target information 154, an X-coordinate value 156, and a Y-coordinate value 158. The measurement data reference destination coordinate 140 indicates the X-coordinate value 126 and the Y-coordinate value 128, which are included in the original file. The reference destination file name 142 indicates a file name of the original file. The data comment information reference destination coordinate 144 indicates the X-coordinate value 126 and the Y-coordinate value 128 of the following comment information 124 in the original file. The comment information 124 is one indicating the data corresponding to the coordinate indicated by the measurement data reference destination coordinate 140. The first condition comment reference destination coordinate 146 indicates the X-coordinate value 126 and the Y-coordinate value 128 of the following comment information 124 in the original file. The comment information 124 is one about any one of the original data specification information 122 in the original file. Because the original data specification information 122 indicates the measurement condition, the comment information 124 comments on the measurement condition. Hereinafter, this measurement condition is referred to as "a first measurement condition". The first condition data reference destination coordinate 148 indicates the X-coordinate value 126 and the Y-coordinate value 128 of the data of the first measurement condition included in the original file. The second condition comment reference destination coordinate 150 indicates the X-coordinate value 126 and the Y-coordinate value 128 of the following comment information 124 in the original file. In the original file, the comment information 124 is one of the original data specification information 122 and is comment information about a measurement condition different from the first measurement condition. Because the original data specification information 122 indicates the measurement condition, the comment information 124 comments on the measurement condition. Hereinafter, this measurement condition is referred to as "a second measurement condition". The second condition data reference destination coordinate 152 indicates the X-coordinate value 126 and the Y-coordinate value 128 of the data of the second measurement condition included in the original file. In the embodiment, the number of kinds of the original data specification information 122 correlated with the original data 120 in the original file and the number of sets of the information commenting on the measurement conditions in the template file and the data of the measurement conditions are determined so as to be matched with each other. The storage target information 154 is one indicating whether storage into the database is necessary or not. In the embodiment, when the storage target information 154 indicates "-", it is not yet determined whether storage into the database is necessary or not. When the storage target information 154 indicates "1", the original data 120 correlated with it is included in the database. When the storage target information 154 is "0", the original data 120 correlated with it is not included in the database. The storage target information 154 of "1" is specified by a combination of the information indicating data constituting a part of the database in the designation information and the information indicating the kind of data constituting a part of the database. As used herein, the "information indicating data constituting a part of the database in the designation information" means information indicating the registered data checkbox 132 checked by the operator. The "information indicating the kind of data constituting a part of the database" means information indicating the data type checkbox 134 checked by the operator. The X-coordinate value 156 indicates a value correlated with the measurement data reference destination coordinate 140, the reference destination file name 142, the data comment information reference destination coordinate 144, the first condition comment reference destination coordinate 146, the first condition data reference destination coordinate 148, the second condition comment reference destination coordinate 150, the second condition data reference destination coordinate 152, or the storage target information 154. The Y-coordinate value 158 indicates a value, which is different from the X-coordinate value 156 and is correlated with the measurement data reference destination coordinate 140, the reference destination file name 142, the data comment information reference destination coordinate 144, the first condition comment reference destination coordinate 146, the first condition data reference destination coordinate 148, the second condition comment reference destination coordinate 150, the second condition data reference destination coordinate 152, or the storage target information 154. In the embodiment, the measurement data reference destination coordinate 140, the reference destination file name 142, the data comment information reference destination coordinate 144, the first condition comment reference destination coordinate 146, the first condition data reference destination coordinate 148, the second condition comment reference destination coordinates 150, the second condition data reference destination coordinates 152, and the storage target information 154 are correlated with the X-coordinate value 156 and the Y-coordinate value 158, to thereby be arranged and displayed on the two-dimensional plane. Similarly to the original file, in the embodiment, the measurement data reference destination coordinate 140, the reference destination file name 142, the data comment information reference destination coordinate 144, the first condition comment reference destination coordinate 146, the first condition data reference destination coordinates 148, the second condition comment reference destination coordinates 150, the second condition data reference destination coordinates 152, and the storage target information 154 are indirectly correlated with one another, because the correlated Y-coordinate values 158 is common thereto.

When the template file is read, the database construction unit 90 changes the content of the template file based on the content of the original file. The change is to rewrite each reference destination coordinate except for the measurement data reference destination coordinate 140 in the information indicated by the reference destination coordinate. The content of the storage target information 154 is also rewritten. That is, the data comment information reference destination coordinate 144 is rewritten in the same content as the comment information 124 correlated with each piece of data in the original file. The first condition comment reference destination coordinate 146 is rewritten into the comment information 124 about the first measurement condition in the original file. The first condition data reference destination coordinate 148 is rewritten into the original data specification information 122 about the first measurement condition in the original file. The second condition comment reference destination coordinate 150 is rewritten into the comment information 124 about the second measurement condition in the original file. The second condition data reference destination coordinate 152 is rewritten into the original data specification information 122 about the second measurement condition in the original file. The content of the storage target information 154 is rewritten in "1" or "0" based on the combination of the information indicating the data constituting a part of the database in the designation information and the information indicating the kind of data constituting a part of the database. As described above, the registered data checkbox 132 that is second from the top and the data type checkbox 134 corresponding to the comment information 124 of "current value" are checked in the checkboxes of FIG. 5. In the template file, the storage target information 154 that is seventh from the top in FIG. 6 corresponds to these checked checkboxes. Accordingly, only the storage target information 154 that is seventh from the top is rewritten in "1" and the rest is rewritten in "0". The rewritten template file becomes a configuration data specification information file. FIG. 7 is a conceptual diagram illustrating the structure of the configuration data specification information file. In the embodiment, in the configuration data specification information file, the comment information 124 about the first measurement condition and the original data specification information 122 about the first measurement condition are dealt with as the first measurement condition information 160 about the database. The comment information 124 about the second measurement condition and the original data specification information 122 about the second measurement condition are dealt with as the second measurement condition information 162 about the database. In the embodiment, the first measurement condition information 160 and the second measurement condition information 162 are the configuration data specification information in the database. The database is configured in advance such that the first measurement condition information 160 and the second measurement condition information 162 are the configuration data specification information. As a result, in the embodiment, the content of the configuration data specification information is matched with the content of the forming condition of the original data 120. In the embodiment, each piece of information constituting the configuration data specification information file is correlated with one another through the Y-coordinate value 158. Therefore, in the configuration data specification information file, the configuration data specification information and the original data specification information 122 are correlated with each other. When the template file becomes the configuration data specification information file, the configuration data specification information storage 92 stores the configuration data specification information file. Therefore, the configuration data specification information storage 92 stores one of the configuration data specification information and one of the original data specification information 122 while correlating the one of the configuration data specification information and the one of the original data specification information 122 with each other (S104).

When the configuration data specification information file is stored, the database construction unit 90 reads the following original data 120 in the original file. The original data 120 is correlated with the coordinate indicated by the measurement data reference destination coordinate 140. The coordinate is correlated with the storage target information 154 which is "1" in the configuration data specification information file. When the original data 120 is read, the database storage 70 stores the original data 120 while correlating the original data 120 with the following configuration data specification information under the control of the database construction unit 90. The configuration data specification information is correlated with the storage target information 154 which is "1" in the configuration data specification information file. The correlated configuration data specification information includes information about the measurement condition corresponding to the checked measurement condition checkbox 130. Through the control, the database storage 70 of the virtual database storage device 60 stores one of the original data 120 while correlating the one of the original data 120 with the configuration data specification information. The original data 120 is correlated with the original data specification information 122 stored in the configuration data specification information storage 92 in the plurality of pieces of original data specification information 122 of the original file. This enables a database to be constructed. The database construction unit 90 controls the virtual database storage device 60 such that the database is constructed (S106).

Next, the original file storage 82 determines whether a request to add database configuration data is made from the operator (S108). If the request to add database configuration data is made (YES in S108), the original file storage 82 stores a new original file (S110).

Then, based on the new original file and the configuration data specification information file stored in the configuration data specification information storage 92, the storage device controller 84 controls the virtual database storage device 60 such that the new database configuration data is added to the database (S112). Then, as long as the request to add the database configuration data is made (YES in S106), the steps in S108 and S110 are repeated.

[Description of Effect]

In the database construction device 62 of the embodiment, the correlation of the information is performed under the control of the database construction unit 90. Therefore, the work to construct the database can be made efficient compared with the case that the correlation is performed by the operation of the operator every time the original data 120 is stored.

In the database construction device 62 of the embodiment, the original data specification information 122 indicates the plurality of kinds of measurement conditions for the value indicated by the original data 120. The configuration data specification information 160, 162 indicate the plurality of kinds of measurement conditions for the value indicated by the database configuration data. Based on the correlation between the original data specification information 122 and the configuration data specification information 160, 162, the plurality of kinds of measurement conditions for the value indicated by the database configuration data correspond to the plurality of kinds of measurement conditions for the value indicated by the original data 120. Therefore, the appearance of the plurality of kinds of measurement conditions influencing the database configuration data can be promoted.

In the database construction device 62 of the embodiment, at least a part of combinations of the plurality of kinds of measurement conditions indicated by the first measurement condition information 160 and the second measurement condition information 162 and at least a part of combinations of the plurality of kinds of measurement conditions indicated by the original data specification information 122 have in common. Therefore, the measurement condition is reflected in the database configuration data. Because the measurement condition is reflected in the database configuration data, the appearance of the measurement condition of the added data can further be promoted when the work to construct the database is made efficient compared with the case that the measurement condition is not reflected in the database configuration data.

In the database construction device 62 of the embodiment, the plurality of kinds of measurement conditions for the value indicated by the original data 120 can fluctuate independently of each other. Therefore, an influence of interaction between the measurement conditions can be suppressed compared with the case that the measurement conditions can fluctuate under the mutual influence. Because the influence of the interaction is suppressed, factors that affect the original data 120 can be clarified compared with the case that the measurement conditions can fluctuate under the mutual influence.

In the database construction device 62 of the embodiment, the original data designated by the designation information can constitute a part of the database. As a result, the appearance of the measurement condition of the added data can be promoted, and a risk that factors, which are not expected by an analyst, affect the data underlying the analysis can be suppressed in updating the database.

The database construction method and the database construction program of the embodiment can promote the appearance of the forming condition of the data constituting the database when the work to construct the database is made efficient.

The embodiment disclosed herein is an example in all respects. The scope of the present invention is not limited to the above embodiment. Various design changes may be made without departing from the scope of the present invention.

The plurality of kinds of measurement conditions indicated by the original data specification information does not have to fluctuate independently of each other. For example, one of the measurement conditions may be determined based on at least two of the other measurement conditions. One of the measurement conditions may be fixed based on any one of the other measurement conditions and the measurement condition that is not indicated by the original data specification information.

The correlation between the original data specification information 122 and the configuration data specification information does not have to be based on the rule that at least some of combinations of the measurement conditions indicated by the original data specification information 122 and the configuration data specification information have in common.

The database construction device of the present invention is not limited to one constructed with a single computer together with the database storage device 60. That is, the database construction device of the present invention may construct the database of the database storage device 60 connected through the Internet 20.

In the database construction device of the present invention, the use of the database is not limited to the quality control.

DESCRIPTION OF REFERENCE SIGNS

10: Computer
20: the Internet
22: USB memory
30: controller
32: Storage
34: Fixed disk
36: Mouse
38: Display device
40: Keyboard
42: Connector
44: Communication I/O
60: Virtual database storage device
62: Virtual database construction device
70: Database storage
72: Information analyzer
74: Analysis result display
80: Designation information input unit
82: Original file storage
84: Storage device controller
86: Request display
90: Database construction unit
92: Configuration data specification information storage
120: Original data
122: Original data specification information
124: Comment information
126, 156: X-coordinate value
128, 158: Y-coordinate value
130: Measurement condition checkbox
132: Registration data checkbox
134: Data type checkbox
136: OK button
140: Measurement data reference destination coordinate
142: Reference destination file name
144: Data comment information reference destination coordinate
146: Condition comment reference destination coordinate
148: Condition data reference destination coordinate
150: Condition comment reference destination coordinate
152: Condition data reference destination coordinate
154: Storage target information
160: First measurement condition information
162: Second measurement condition information

The invention claimed is:

1. A database construction method comprising:
an original file storage step in which a storage of a computer that includes the storage, a controller, and an information input unit stores an original file including a plurality of pieces of original data indicating measured values and original data specification information indicating a combination of a plurality of kinds of measurement conditions for the measured values, which are indicated by the plurality of pieces of original data while being correlated with the plurality of pieces of original data on a one-to-one basis;
a designation information input step of inputting designation information indicating designation of any combination of the plurality of kinds of measurement conditions indicated by the original data specification information and designation of any one of the plurality of pieces of original data to the information input unit;
a configuration data specification information storage step in which the storage stores configuration data specification information while correlating the configuration data specification information with the original data specification information; and
a storage control step in which the controller controls the storage such that the storage stores the original data designated by the designation information while correlating the original data with the configuration data specification information, which is stored while being correlated with the original data specification information in the configuration data specification information storage step, as at least a part of a database including a plurality of pieces of database configuration data indicating the measured values and the configuration data specification information correlated with each of the plurality of pieces of database configuration data,
wherein a value correlated with the original data specification information is associated with the original data in a one-to-one basis,
a value correlated with the original data is associated with the original data specification information in a one-to-one basis,
the value correlating the original data with the original data specification information and the value correlating the original data specification information with the original data are equal to each other, so that the original data and the original data specification information are indirectly correlated with each other,
the configuration data specification information is information indicating a combination of a plurality of kinds of measurement conditions for the value indicated by the database configuration data,
the configuration data specification information storage step includes a step in which the storage stores information indicating s combination of a plurality of kinds of measurement conditions indicated by the designation information as the configuration data specification information, and
the storage control step includes:
a step of correlating the value, which is correlated with the original data specification information and corresponds to the original data designated by the designation information, with the configuration data specification information stored in the configuration data specification information storage step as the value correlated with the original data; and
a step of specifying the original data designated by the designation information and the configuration data specification information stored in the configuration data specification information storage step based on the value correlated with the original data specification information and the value correlated with the original data, so that the storage stores the original data and the configuration data specification information, which are specified based on the value correlated with the original data specification information and the value correlated with the original data.

* * * * *